United States Patent
Schreiner et al.

(10) Patent No.: US 8,365,589 B2
(45) Date of Patent: Feb. 5, 2013

(54) DEVICE FOR GENERATING ENERGY IN A ROTATING SYSTEM

(75) Inventors: Hans-Jürgen Schreiner, Neukirchen am Sand-Rollhofen (DE); Reiner Bindig, Bindlach (DE); Konrad Tzschentke, Pommelsbrunn (DE); Alfons Kelnberger, Bamberg (DE)

(73) Assignee: CeramTec GmbH, Plochingen (DE)

( * ) Notice: Subject to any disclaimer, the term of this patent is extended or adjusted under 35 U.S.C. 154(b) by 132 days.

(21) Appl. No.: 12/921,675

(22) PCT Filed: Mar. 10, 2009

(86) PCT No.: PCT/EP2009/052761
§ 371 (c)(1),
(2), (4) Date: Sep. 9, 2010

(87) PCT Pub. No.: WO2009/112477
PCT Pub. Date: Sep. 17, 2009

(65) Prior Publication Data
US 2011/0011172 A1    Jan. 20, 2011

(30) Foreign Application Priority Data
Mar. 10, 2008    (DE) .................. 10 2008 013 498

(51) Int. Cl.
*B60C 23/02*    (2006.01)
(52) U.S. Cl. .................................................. 73/146.5
(58) Field of Classification Search .......... 73/146–146.8
See application file for complete search history.

(56) References Cited

U.S. PATENT DOCUMENTS

| | | | |
|---|---|---|---|
| 5,644,184 A * | 7/1997 | Kucherov | 310/306 |
| 7,504,763 B2 | 3/2009 | Haswell et al. | |
| 7,549,327 B2 * | 6/2009 | Breed | 73/146 |
| 7,603,894 B2 * | 10/2009 | Breed | 73/146 |
| 2004/0078662 A1 | 4/2004 | Hamel et al. | |
| 2005/0110277 A1 * | 5/2005 | Adamson et al. | 290/1 R |
| 2005/0274176 A1 * | 12/2005 | Thiesen et al. | 73/146 |
| 2006/0243043 A1 * | 11/2006 | Breed | 73/146 |
| 2006/0260390 A1 | 11/2006 | Oflaz | |
| 2007/0295069 A1 * | 12/2007 | Mancosu et al. | 73/146 |
| 2008/0252174 A1 * | 10/2008 | Mohammadi et al. | 310/319 |
| 2009/0211353 A1 * | 8/2009 | Gao et al. | 73/146.5 |
| 2009/0243830 A1 * | 10/2009 | Heise et al. | 340/447 |
| 2010/0083746 A1 * | 4/2010 | Chen et al. | 73/146.4 |
| 2010/0170332 A1 * | 7/2010 | Kammann et al. | 73/146.5 |

FOREIGN PATENT DOCUMENTS

| | | |
|---|---|---|
| DE | 60310104 T2 | 8/2007 |
| EP | 1605528 A | 12/2005 |
| EP | 1650057 A | 4/2006 |

OTHER PUBLICATIONS

PCT International Search Report issued in corresponding application PCT/EP2009/052761.

* cited by examiner

*Primary Examiner* — Andre Allen
(74) *Attorney, Agent, or Firm* — Fulbright & Jaworski LLP

(57) ABSTRACT

A device for generating electrical energy in a rotating system for the purpose of supplying electric current to electronic components in the system, comprising external forces, acting on the system, that act on piezoelectrically active energy converters in the system, as a result of which electrical energy is generated, and comprising an electronic system for processing the generated electrical energy and transferring it to the components.

15 Claims, 2 Drawing Sheets

DEVICE FOR GENERATING ENERGY IN A ROTATING SYSTEM

RELATED APPLICATIONS

This application is a §371 application of PCT/EP2009/052761 filed Mar. 10, 2009, which claims priority from German Patent Application No. 10 2008 013 498.8 filed Mar. 10, 2008.

BACKGROUND OF THE INVENTION

The invention relates to a device for generating electrical energy in a rotating system for the purpose of supplying electric current to electronic components in the system, comprising external forces, acting on the system, that act on piezoelectrically active energy converters in the system, as a result of which electrical energy is generated, and comprising an electronic system for processing the generated electrical energy and transferring it to the components.

Such a device is known from DE 603 10 104 T2. In that case, a piezoelectric element, an actuation mass provided for contact with the piezoelectric element, and a control circuit that is electrically connected to the piezoelectric element are arranged inside a tyre or pneumatic tyre. The actuation mass is provided to displace the piezoelectric element as a result of the external forces that act on the actuation mass during use, in order to generate an electrical charge. This electrical charge, or energy, is made available to the components by the control circuit.

It is disadvantageous in this case that the piezoelectric element and the actuation mass are heavy, and affect the rotating system or tyre in its rotational characteristics. Moreover, this device usually cannot provide sufficient energy to supply, for example, sensors and transmission elements in a lasting and reliable manner, with reliable functioning over a long service life, even under extreme acceleration conditions of some 10,000 g.

In addition to capacitive and inductive systems for energy transmission, and batteries or accumulators for energy storage, piezoceramic-based systems are also known, which, depending on their design—for example, realized as mass oscillators—are relatively sensitive to the forces and deformations that occur during operation in a tyre, as a rotating system, and that can result in the components rapidly being destroyed.

Also known are solutions that are integrated into an inner layer of the tyre running surface and that, owing to their mass, greatly impair the running smoothness, or produce relatively large imbalances.

OBJECTS AND SUMMARY OF THE INVENTION

The invention is based on the object of so improving a device according to the preamble of claim 1 that the system is affected as little as possible in its rotational characteristics. In addition, the device is to provide as much energy as possible, in order to supply, for example, sensors and transmission elements in a lasting and reliable manner, with reliable functioning over a long service life, even under extreme acceleration conditions of some 10,000 g.

This object is achieved, according to the invention, in that the piezoelectrically active energy converters are piezoceramic fibres, each of which has an electrode, and the electrodes of the fibres, which generate a charge of like polarity, are connected via an electrically conductive external electrode. The external forces acting on the system effect acceleration changes during operation, as a result of which the fibres deform briefly and generate electrical charges. These charges are tapped and provided, as electrical energy, to the components. Piezoceramic fibres are light, so that the system is virtually unaffected in its rotational characteristics. In addition, a sufficient quantity of energy can be produced to supply, for example, sensors and transmission elements in a lasting and reliable manner, with reliable functioning over a long service life, even under extreme acceleration conditions of some 10,000 g.

In a preferred embodiment, the rotating system is a tyre, in particular for a motor vehicle.

Preferably, the fibres are mechanically decoupled from one another, as a result of which each fibre contributes towards charge generation.

In a preferred development, the piezoceramic fibres are attached to the inside of the rotating system, and in the case of a tyre are attached to the inside of the running surface, or are integrated into the latter. As a result of this, they are deformed directly by the externally acting forces. If they are integrated into the running surface, this can be effected during production of the tyre, and is not visible to the customer. In addition, the fibres are then protected.

The fibres are preferably arranged in the transverse direction relative to the running surface of the rotating system or tyre, and preferably parallel to one another. This has the advantage that the fibres are more stable in respect of deformations of the system or tyre, and can more easily withstand these loads.

The fibres have a diameter of 0.01 mm-5 mm, preferably of 0.05 mm-2 mm, particularly preferably 0.1 mm-0.5 mm. In the case of these diameters, the fibres, on the one hand, are stable and, on the other hand, generate sufficient charges.

In an inventive development, the fibres are produced by extrusion. As a result, they can be produced in a particularly cost-effective manner and in any length.

The fibres can also be produced, however, by sawing up a plate-type piezoceramic piece. In this case, the fibres usually have a rectangular or square cross-section. The preferred dimensional specifications apply accordingly in this case.

In a preferred embodiment, the fibres, for the purpose of leading off the resultant charges, are connected in groups of fibres, via a highly flexible, three-dimensionally structured, metallic external electrode, which is not destroyed by the forces and deformations acting on the system or tyre.

In an inventive development, the external electrode is constituted by a fine wire mesh. A wire mesh is highly flexible, three-dimensionally structured and metallic.

In a further inventive development, the spacing of the fibres or of the groups of fibres is so selected that the generated charge of individual fibres or groups of fibres is never simultaneously of the opposite polarity. As a result, the charges are increased and do not cancel each other out.

Preferably, the fibres or the groups of fibres that generate a charge of like polarity are electrically combined and connected to a separate rectifier circuit, so that there is no neutralizing of the charges.

The piezoelectric fibres can preferably also be produced in that the fibres in the unused, new state, i.e. as unworked pieces, are piezoceramic plates or lamellae, which during the production process are mechanically worked in such a way that they automatically break into defined fibres during production or during operation. For example, the plates or lamellae can be provided with stampings, along which the plates or lamellae can break.

Preferably, the device is used for measuring the tyre pressure and/or for determining the road-holding and/or movement dynamics of a motor vehicle.

The signal (charge) measured by means of the device can be compared with a setpoint, and a signal can be displayed if the setpoint is exceeded or not attained. For example, an excessively low air pressure in the tyre would result in a signal that deviates from the setpoint.

The invention is explained further in the following.

DETAILED DESCRIPTION

In a preferred embodiment, the invention is characterized in that integrated on an inner surface of the tyre running surface there are piezoelectrically active components, in particular piezoceramic fibres, which generate electrical charges as a result of the variations of acceleration during operation and which, in addition, owing to their being arranged transversely relative to the direction of running, withstand relatively large mechanical deformations of the tyre.

Fibres, or piezoceramic fibres, are understood as a formed body that is thin relative to the length and is flexible. Fibres are also understood as a combination of fibres that constitutes a particular fibre structure. The cross-section of the fibres can be of any form, for example being round or angular or a combination thereof. A structure composed of fibres is firmer and frequently more stiff than a construction of the same shape made from the compact "solid" material.

A variant of the device according to the invention, in the case of a tyre for motor vehicles, consists in that piezoelectric fibre structures, which rotate with the tyre, are arranged over the circumference of the tyre inner surface. These fibre structures are connected, via electrical contacts, to an electronic unit capable of tapping, storing, managing and making available the generated energies.

In principle, a freely suspended, rotating tyre is subjected to centrifugal forces, the accelerations corresponding thereto being a function only of the radius of the tyre and the angular velocity. Without the action of external forces, no electrical energy can be generated by means of the device according to the invention.

During travel, very high acceleration forces occur as a result of the action of external forces, which cause the tyre to become deformed on the contact zone; these acceleration forces generate in the piezoelectric components, as a result of the piezoelectric properties, for example of fibre structures, quantities Q of electrical charge with which, for example, a capacitor having the capacitance C can be charged. This energy E with $$E = \frac{1}{2} \cdot \frac{Q^2}{C}$$

can be retrieved as electrical energy.

Acceleration forces that are effective according to the invention are produced whenever the running surface of the tyre comes into contact with the carriageway. The tyre undergoes deformation as a result, and its even circular motion is thereby disrupted. This causes variations of acceleration to occur, which act with impulses upon the piezoceramic components and effect the charge separation according to the invention.

It is primarily the length of the time interval $\Delta t$, in which the running surface of the tyre is deformed and the direction of motion is thereby altered, that is determinant of the high acceleration values, and therefore determinant of a significant charge generation.

Figure 1:
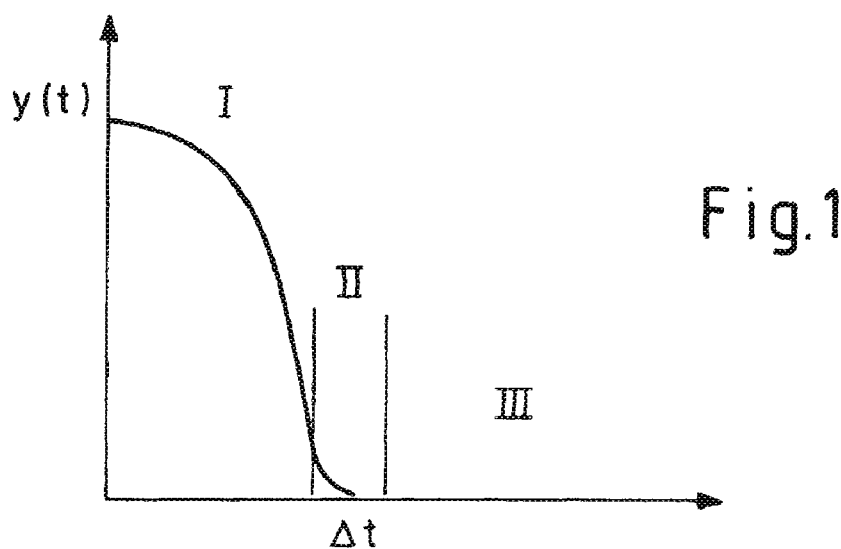
FIG. 1 shows the basic time characteristic of a point on the running surface of a tire in the y direction with the region of impingement on the carriageway.

FIG. 1 shows the basic time characteristic of a point on the running surface of a tyre of a motor vehicle in the y direction with the region of impingement on the carriageway. FIG. 1 thus represents approximately the motion characteristic of a point on the running surface. In region I, the tyre rotates evenly, in region II it begins to deform and impinges on the carriageway, and in region III it is in contact with the carriageway.

It can be estimated, through an appropriate approximation calculation, that the acceleration values to which the piezoelectric components are subjected in region II are proportional to $1/(\Delta t)^2$ ($\Delta t$ denotes the time interval in which the running surface of the tyre is deformed and, consequently, the direction of motion of the fibres is altered). Depending on the condition and the elastic properties of the tyre, and on the angular velocity, dependent on the velocity of the vehicle, this time interval $\Delta t$ can become extremely short, so that accelerations of the order of magnitude of 10,000 g occur.

Additional influences resulting from carriageway surface irregularities or from other vehicle-dynamics factors, as a result of which additional forces are produced and which contribute to charge generation, are not taken into account here.

A first estimate of the charge to be generated in the case of these high accelerations can be made as follows:

If the piezoelectric components or fibres are operated in $d_{33}$ mode, the following relationship exists between a generated charge and an acting force:

$$Q = d_{33} \cdot F$$

wherein d33 represents the piezoelectric charge constant and is of the order of magnitude of, for example, 400 pC/N.

If there lies on the piezoceramic materials a mass of, for example, 0.005 kg, which can be realized by means of an additional rubber layer or the like, a first estimation then gives the charge quantity to be expected per revolution of the tyre $$Q = d_{33} \cdot m \cdot a \Rightarrow$$

$$Q = 400 \frac{pC}{N} \cdot 5 \cdot 10^{-3} \text{ kg} \cdot 10000 \cdot 9.81 \frac{m}{\sec^2} \Rightarrow$$

$$Q \approx 0.2 \ \mu C$$

Consequently, it is possible to generate sufficiently large charge quantities, which, of course, can be varied within a wide range according to the realization of the device according to the invention.

A very great advantage can be achieved if the piezoceramic components are realized as fibres, e.g. as cylinders having diameters of the order of magnitude of 100 μm.

Such fibres can be produced, or formed, relatively inexpensively and in large batches, for example by means of an extrusion process. By means of the methods and processes known in the ceramics industry, these fibres, after electrical contacting and poling, can be operated in $d_{33}$ mode, this providing for a high energy yield.

Clearly, other dimensions and geometries are also conceivable and may be advantageous, depending on the application, for example square fibres or the like.

These fibres can then either be incorporated into the inner structure of the tyre directly during production of the tyre, or they can be combined with elastic films, independently of the tyre. An elastic composite component is thereby produced, which can be incorporated into the structure of the tyre, in the form of so-called patches.

Such patches are also known under the name macro fiber composites (MFC).

The great advantage of the fibre structures, however realized, then consists in that they are well able to withstand the relatively high deformations that occur when the running surface impinges on the carriageway, and they are thus less susceptible to mechanical failure.

This is achieved, in particular, when the fibres are arranged transversely relative to the running surface and parallel to one another. Then, owing to the mechanical decoupling, for example as a composite component, in the case of the typical deformations of the tyre of the order of magnitude of 5 to 10%, they are very stable in respect of these deformations and withstand these loads.

Normally, the load limits of piezoceramic lamellae in respect of deformations are in the per-thousand range; under these conditions, therefore, the piezo-generators (piezoceramic lamellae plus contacting) realized according to the prior art would be destroyed upon the running surface impinging on the carriageway.

Optimum conditions can be set in this respect through purposeful setting of the extent to which the patch is filled with piezoceramic fibres. It is conceivable to vary the spacings of the fibres in parallel arrangement, ranging from directly adjacent up to multiples of the fibre diameter, or fibre width (depending on geometry).

It is also advantageous if a plurality of fibre regions or patches are evenly distributed over the circumference of the tyre inner surface; the imbalance can thus be minimized and the energy provision increased by a multiple.

In a further advantageous variant, the fibre regions are narrower than the contact zone of the tyre. Thus, the generated charge is not compensated by the symmetrical but opposing sequences occurring upon impingement of the tyre surface on the carriageway and upon removal of the tyre surface from the carriageway.

It can also be advantageous if the fibre regions extend entirely, or to a greater or lesser extent continuously, over the inner surface.

A maximum energy yield is thereby achieved, but it must be ensured, through appropriate electronic control, that the piezoelectric effects for charge generation as described above do not cancel each other out.

This can be realized, for example, through a group structure, such that a first group of patches is controlled by an electronic unit that generates energy as the running surface impinges on the carriageway, and a second group of patches is controlled by a second electronic unit that generates energy as the running surface leaves the carriageway.

The spacing of the individual patches can also be arranged in such a way that a group of patches in the above sense is sufficient.

Instead of the fibre structures, continuous piezoceramic plates or lamellae of appropriate geometry would also be entirely suitable. Although—as already mentioned—the latter would be destroyed during operation, the function according to the invention could nevertheless be maintained through appropriate contact arrangement.

An appropriate contact arrangement could be constituted by a type of flexible, electrically conductive network on these plates, which withstands the high deformations during operation of the tyre.

It would likewise be conceivable, in a further embodiment, for piezoceramic plates to be provided with a stamping during the production process, such that the plates automatically break into defined fibres during production or during operation.

In an advantageous embodiment, the device is used for measuring the tyre pressure and/or for determining the road-holding and/or movement dynamics.

If a tyre on a motor vehicle has an excessively low pressure, the contact zone of the tyre on the road is greater than in the case of a tyre having a correctly set pressure. This results in a different measurement signal of the device. If this measurement signal is tapped and compared with the measurement signal of a tyre having a correct pressure, then either the pressure in the tyre and/or a signal for a tyre having an excessively low pressure can be achieved. This signal must then be displayed in an appropriate manner. The deformation of the tyre in the road plane can then also be used to obtain information concerning the carriageway and the movement dynamics.

Figure 2:
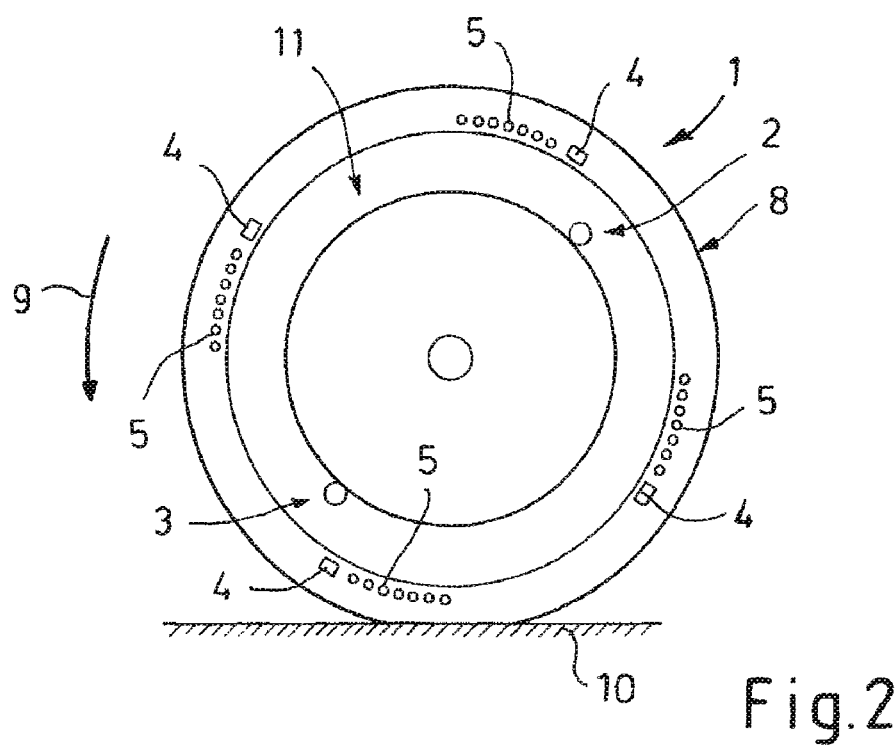
FIG. 2 is an exemplary embodiment of the device according to the invention.
Figure 3:
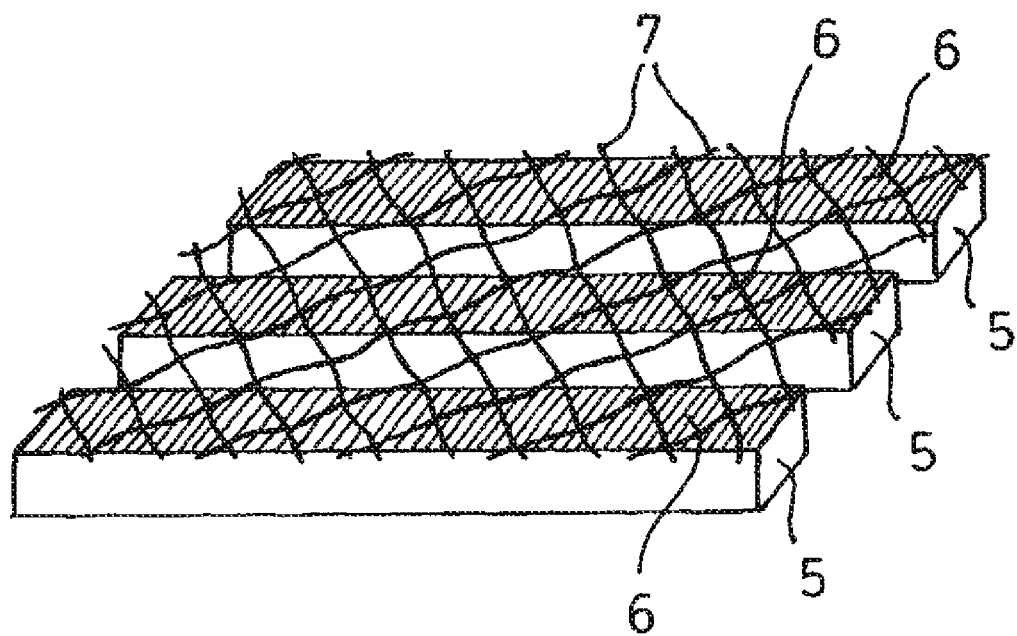
FIG. 3 shows, in a section, three fibers 5, each of which has an electrode 6.

A preferred exemplary embodiment of the device according to the invention is represented in FIG. 2. FIG. 3 shows the fibres 5 or fibre structures according to the invention with, in each case, an electrode 6 and the associated external electrode 7.

The rotating system 1 is a tyre for a vehicle, preferably a motor vehicle or a motorcycle, having a running surface 8, a side surface 11, of a rubber-type composite material according to the prior art. The direction of rotation 9 on the carriageway 10 is indicated by an arrow. Set into the running surface 8 there are piezoceramic fibre structures or fibres 5 (see FIG. 3), which are acted upon by acceleration forces of differing magnitudes during operation. As a result, charges are produced, which can be stored and controlled via the electronics and control unit 4 that is electrically connected to the fibres. The electronics and control units 4 are located on the inside of the running surface 8, i.e. where the fibre structures, or fibres 5, are also arranged. Energy can thereby be supplied, for example, to sensor elements 2 for measuring the tyre pressure, or to other sensors, or also communication elements 3, or other electronic components. The fibres 5 in this case are combined to form groups of fibres 5, being four groups as shown in FIG. 3, and are not destroyed by the forces and deformations acting upon the tyres. The piezoelectric fibres 5 need not necessarily be divided into four groups or sub-regions; there may be any number of regions or, also, only one region. What is important is that, irrespective of the number or dimension of these regions, they are divided electrically into individual sub-regions. The reason for this is that otherwise the effects for charge generation can cancel each other out, owing to direction-dependent functions as the running surface impinges on the carriageway and as the running surface is released from the carriageway.

FIG. 3 shows, in a section, three fibres 5, each of which has an electrode 6. The electrodes 6 are electrically connected to one another via an external electrode 7. The external electrode 7 consists of a fine wire mesh, which is of a highly flexible, three-dimensional structure, and which is composed of a metal and arranged above and/or below the fibres. The fibres 5 can be adhesive-bonded, heat-fused or soldered onto the electrodes 6. The electrical wiring could be such that the individual fibres 5, fibre regions or fibre structures are electrically connected to one another, and to the unit composed of the electronics, sensor element 2 for measuring the air pressure and the communication element 3, via the external electrode 7, for example by means of cables or other conductor paths laminated into the tyre.

The invention claimed is:

1. A device for generating electrical energy in a rotating system for supplying electric current to electronic components in the system, having external forces, acting on the system, that act on piezoelectrically active energy converters in the system, as a result of which electrical energy is generated, and comprising an electronic system for processing the generated electrical energy and transferring it to the components, wherein the piezoelectrically active energy converters are piezoceramic fibers, each of which has an electrode, wherein the electrodes of the fibers, which generate a charge of like polarity, are connected via an electrically conductive external electrode, and wherein the fibers are mechanically decoupled from one another.

2. A device according to claim 1, wherein the rotating system is a tire, in particular for a motor vehicle.

3. A device according to claim 1, wherein the fibers are attached to the inside of the rotating system.

4. A device according to claim 1, wherein the fibers are arranged in the transverse direction relative to the running surface of the rotating system.

5. A device according to claim 1, wherein the fibers have a diameter of 0.01 mm-5 mm.

6. A device according to claim 1, wherein the fibers are produced by extrusion.

7. A device according to claim 1, wherein the fibers are produced by sawing up a plate-type piezoceramic piece.

8. A device according to claim 1, wherein the fibers, for the purpose of leading off the resultant charges, are connected in groups of fibers, via a highly flexible, three-dimensionally structured, metallic external electrode, which is not destroyed by the forces and deformations acting on the system or tire.

9. A device according to claim 1, wherein the external electrode is constituted by a line wire mesh.

10. A device according to claim 1, wherein the spacing of the fibers or of the groups of fibers is selected so that the generated charge of individual fibers or groups of fibers is never simultaneously of the opposite polarity.

11. A device according to claim 1, wherein the fibers or the groups of fibers that generate a charge of like polarity are electrically combined and connected to a separate rectifier circuit so that there is no neutralizing of the charges.

12. A device according to claim 1, wherein the device is used for measuring the tire pressure or for determining the road-holding or movement dynamics of a motor vehicle.

13. A device according to claim 1, wherein the signal measured by means of the device is compared with a setpoint, and a signal is displayed if the setpoint is exceeded or not attained.

14. A method for producing fibers for use for a device according to claim 1, wherein the fibers in the unused, new state are piezoceramic plates or lamellae, which during the production process are mechanically worked in such a way that they automatically break into defined fibers during production or during operation.

15. A device according to claim 1, wherein the fibers are arranged in parallel to one another.

\* \* \* \* \*